United States Patent [19]

Roller

[11] Patent Number: 4,816,818
[45] Date of Patent: Mar. 28, 1989

[54] HEAVY DUTY LAMP FLASHER FOR TRUCKS, TRAILERS AND THE LIKE

[75] Inventor: Philip C. Roller, Ashville, N.Y.
[73] Assignee: Truck-Lite Co., Inc., Falconer, N.Y.
[21] Appl. No.: 59,758
[22] Filed: Jun. 8, 1987

Related U.S. Application Data

[63] Continuation-in-part of Ser. No. 46,898, May 5, 1987.
[51] Int. Cl.$^4$ .......................... B60Q 1/46; B60Q 1/26; H05B 37/00
[52] U.S. Cl. .................................... 340/475; 340/431; 315/200 A
[58] Field of Search ...................... 340/81 R, 72, 81 F, 340/82, 83, 73, 74; 315/82, 83; 307/10 LS

[56] References Cited

U.S. PATENT DOCUMENTS

| | | | |
|---|---|---|---|
| 3,413,519 | 11/1968 | Leeder, Jr. | 340/81 R |
| 3,452,248 | 6/1969 | Leeder, Jr. | 340/81 R |
| 3,728,713 | 4/1973 | Alten | 315/200 A |
| 4,150,359 | 4/1979 | Mizuno et al. | 340/81 R |
| 4,155,069 | 5/1979 | Mason | 340/81 R |
| 4,390,812 | 6/1983 | Seidler | 315/200 A |

*Primary Examiner*—Joseph A. Orsino
*Assistant Examiner*—Anh H. Tran

[57] ABSTRACT

A heavy duty lamp flasher for turn signals for trucks, trailers and the like including a switching relay having normally open and normally closed contacts and a moveable relay arm and relay coil, and an arc suppression circuit formed of a transistor or pair of transistors connected in parallel with the switching relay to minimize contact arcing and load carrying limitations. A diode and capacitor pair is connected to an integrated circuit oscillator for activating and deactivating the relay and another diode and capacitor pair is connected to the gate of the transistor and to the relay coil, such that the mechanical contacts of the relay, with their inherent mechanical delay, control the transistor circuitry so that the transistor provides the primary current path during movement of the arm between the normally closed and normally open contacts and the normally open contact provides the primary current path when it is closed.

15 Claims, 4 Drawing Sheets

4,816,818

HEAVY DUTY LAMP FLASHER FOR TRUCKS, TRAILERS AND THE LIKE

PRIOR RELATED APPLICATIONS

This application is a continuation-in-part of my earlier application Ser. No. 046,898 filed May 5, 1987.

BACKGROUND AND OBJECTS OF THE INVENTION

The present invention relates in general to a heavy duty lamp flasher for trucks and trailers and the like, and more particularly to an "in line" type flasher for turn signals for trucks and trailers.

Heretofore, a number of electronically controlled electro-mechanical relay type flashers have been previously used for causing flashing of the turn signals of trucks, trailers and the like, but problems have been encountered with these devices because of contact arcing reducing their useful service life and their load carrying capacity. Also, bimetal type and electromagnetically powered flywheel type flashers have been used for such applications, but these have encountered the same problems with contact arcing, resulting in reduced useful service life and load carrying capacity. Purely electronic type flashers have also been provided in an effort to overcome these problems, but such purely electronic types are expensive and fail to meet legal voltage drop requirements at high currents.

An object of the present invention, therefore is the provision of novel heavy duty lamp flasher circuitry for turn signals and flasher lamp applications for trucks, trailers and like vehicles, which relieves the problems encountered with prior art electromechanical relay type flashers and similar non purely-electronic flasher systems, to improve the service life of the flasher circuitry in such applications under conditions of heavy lamp loads.

Another object of the present invention is the provision of a novel heavy duty lamp flasher system for trucks, trailers and the like as described in the immediately preceding paragraph, which includes an active arc suppression circuit comprising a transistor in parallel with the switching relay to relieve problems of contact arcing and load carrying limitations of previously used electromechanical relay and similar type flasher systems.

Another object of the present invention is the provision of a heavy duty lamp flasher system and circuitry as described in the two immediately preceding paragraphs, wherein the relay in parallel with the transistor controls the transistor in such a way as to reduce contact arcing and enhance load carrying ability by causing the load to be shared by the switching devices and thus enable the device to switch currents in excess of the maximum ratings for either the transistor and the relay.

Other objects, advantages and capabilities of the present invention will become apparent from the following detailed description, taken in conjunction with the accompanying drawings illustrating preferred embodiments of the invention.

DETAILED DESCRIPTION OF PREFERRED EMBODIMENTS

Figure 1:
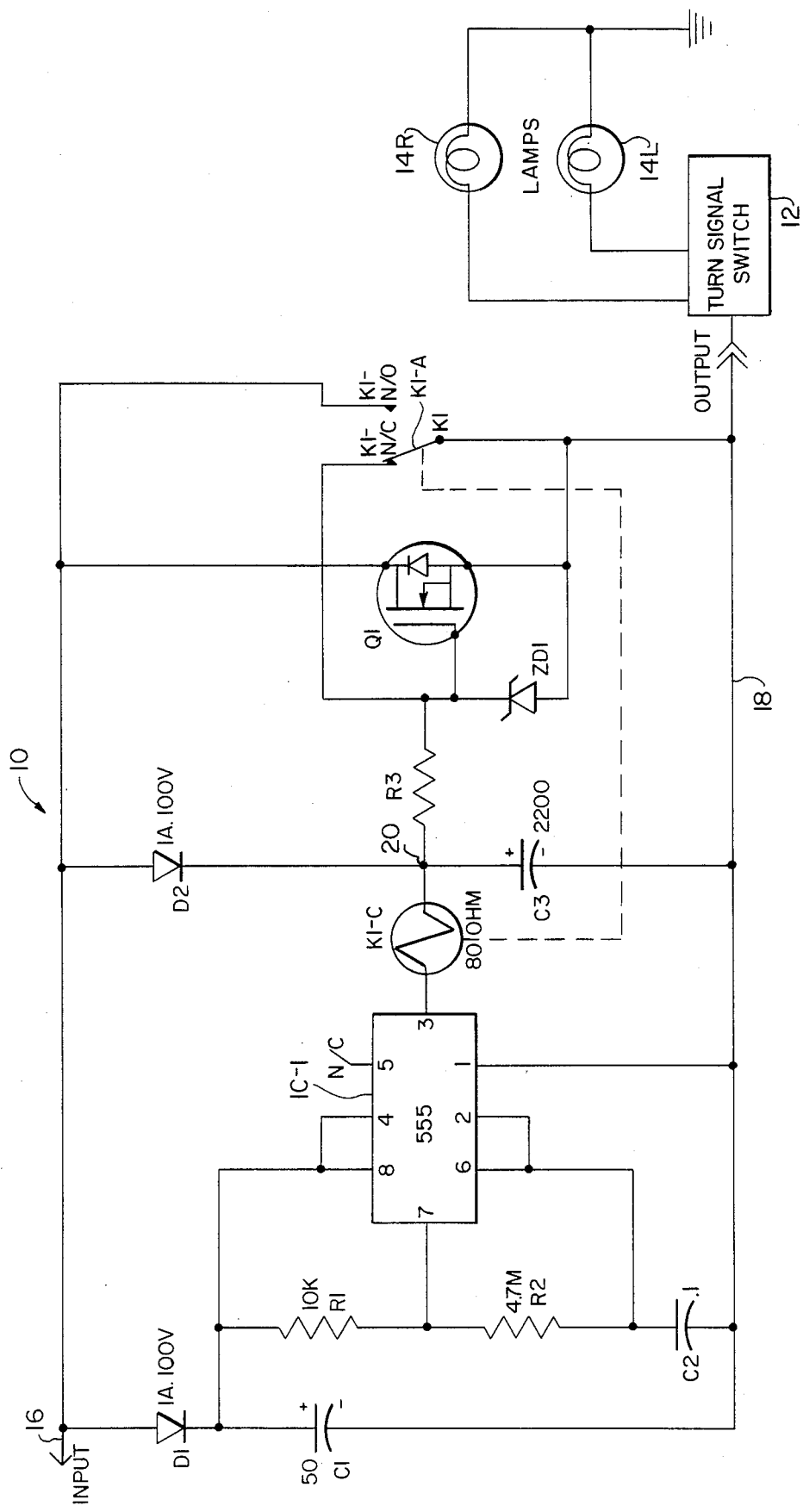
FIG. 1 is a schematic diagram of a heavy duty lamp flasher of the "in line" type for truck and trailers, embodying the present invention.

Referring to the drawings, wherein like reference characters designate corresponding parts and components throughout the present invention, there is shown in FIG. 1 an in line type of heavy duty lamp flasher control circuitry, indicated generally by the reference character 10, associated with a conventional turn signal switch 12 and a pair of lamps 14L, 14R of a truck, trailer of similar vehicle, which in the illustrated embodiment are the turn signal lamps for the vehicle. It will be appreciated, however, that the flasher circuitry of the present invention can be used for control of any types of lamps for which it is desired, on the associated vehicle.

The lead 16 of the flasher circuitry is connected to the usual truck power supply and a pair of diodes D1 and D2 are connected to capacitors C1 and C3 and these diode and capacitor pairs are connected between the supply lead 16 and ground through the lead 18 and the filaments of the connected lamps 14L, 14R. The contact system of the relay K1, comprising the movable relay arm K1-A and the stationary contacts K1-N/C and K1-N/O are also connected between the supply lead 10 and the grounded lead 18. The coil K1-C of the relay K1 is connected between the juncture 20 between the diode D2 and capacitor C3 and the pin 3, as indicated, of an integrated circuit oscillator IC-1, which may be a number 555 commercially available integrated circuit, The pins of this oscillator integrated circuit IC-1 are connected as shown, with a pair of resistors R1 and R2 and capacitor C2 connected between the juncture of the diode D1 and capacitor C1 and the grounded lead 18.

The juncture 20 connected between the diode D2 and capacitor C3 and to the coil K1-C of the relay K1 is also connected through resistor R3 to the gate of the transistor Q1, which is an N channel power MOSFET, having drain and source connections, as shown, to the supply lead 16 and grounded lead 18 and through the zener diode ZD1 connected between the gate and the emitter of the transistor. When the device is turned on, capacitors C1 and C3 are charged through the diode D1 and D2.

The transistor Q1 will be held in the off state due to the fact that its gate is held at ground through the normally closed stationary contact K1-N/C and relay contact arm K1-A. When the oscillator IC-1 receives its operating voltage, it will energize the relay coil K1-C, causing the relay armature to begin to move. As the normally closed contacts K1-N/C and K1-A open, the gate of the transistor Q1 is pulled high through the resistor R3. The zener diode ZD1 prevents the gate of the transistor Q1 from exceeding the maximum gate-to-source voltage. The positive voltage on the gate of the transistor Q1 turns on the transistor, causing current to begin to flow in the lamps 14L, 14R, connected through the turn signal switch 12, before the normally open contacts K1-N/O and K1-A close. Once these normally open contacts at K1-N/O of the relay K1 are closed, they become the primary current path for the lamp current through lamps 14L and 14R. When oscillator IC-1 changes state, the relay coil K1-C will deenergize, and the relay armature will begin to move, opening the normally open contacts of relay K1 at K1-N/O which had closed during the previous state of the oscillator. The transistor Q1 will again become the primary current path for the lamps 14L and 14R. When the normally closed contacts at K1-N/C of the relay close, the gate of the transistor Q1 is connected to ground, turning it off and completing the cycle.

The use of the solid state switch formed by the N channel power MOSFET transistor Q1 working in parallel with the mechanical switch formed by the movable arm K1-N/C and contacts K1-N/C and K1-N/O of the relay, and the use of the mechanical contacts, with their inherent mechanical delay, to control the solid state switch formed by transistor Q1 provides a unique flasher control circuit. Due to the fact that the transistor switch Q1 is the initial and final current path, the relay contacts K1-A, K1-N/C and K1-N/O have to switch only the additional current produced by the elimination of the voltage drop across the transistor Q1 when the contacts close. Since the transistor Q1 is always on when the relay is in a state of transition, arcing, which would be produced by contact bounce and opening, is reduced Also, using the relay K1 and transistor Q1 in parallel allows the device to switch currents in excess of maximum rating of either the transistor or the relay. In practice such a circuit with the transistor Q1 rated at 12 amperes rms and a relay K1 rated at 16 amps at 12 volts successfully switched a load of 33.6 amperes for 1.6 million cycles.

Figure 2:
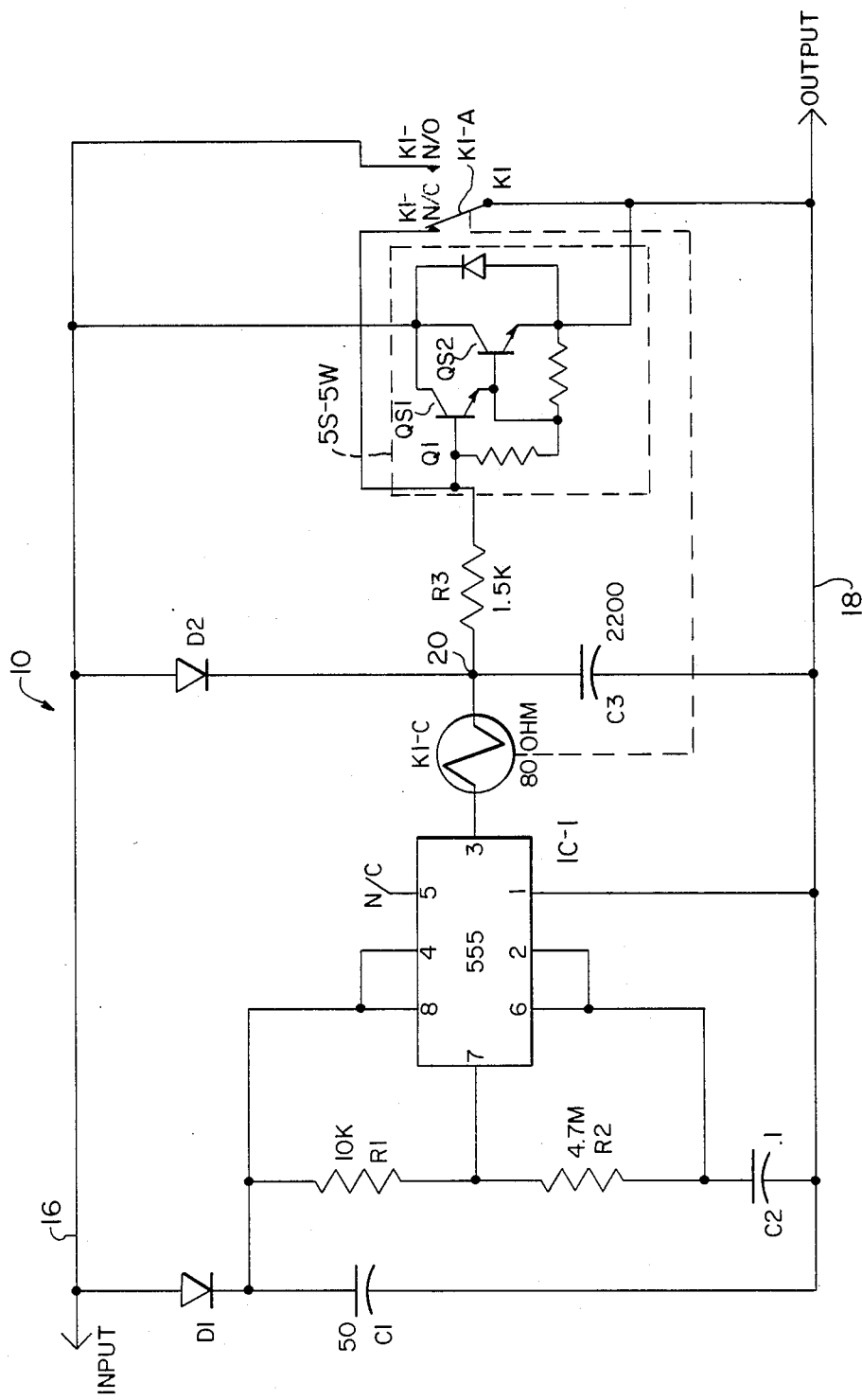
FIG. 2 is a schematic diagram of a grounded type of heavy duty lamp flasher embodying the present invention.

FIG. 2 shows an alternative arrangement wherein the circuitry to the left of the solid state switch SS-Sw are the same as in FIG. 1, but the solid state switch is formed by an npn Darlington circuit formed of two transistor sections QS1 and QS2 as shown, which operate in the same fashion as the transistor Q1 of FIG. 1, in that the positive voltage on the gate of the first Darlington transistor section QS1 turn on the transistors causing current to begin to flow in the lamps, such as 14L, 14R of FIG. 1 connected to the output, before the normally open contacts at K1-N/O close. In the FIG. 2 arrangement, as in the FIG. 1 arrangement, once the normally open contacts of the relay at K1-N/O are closed, they become the primary current path for the lamp circuit, and when the oscillator IC-1 changes state and the relay coil K1-C is deenergized, and the relay armature begins to move opening the normally open contacts at K1-N/O and the solid state switch formed by the Darlington transistor sections QS1 and QS2 again become the primary current path. When the normally closed contacts at K1-N/C close, the gate for the first transitor section QS1 of the solid state switch SS-Sw is connected to ground turning it off and completing the cycle.

Figure 3:
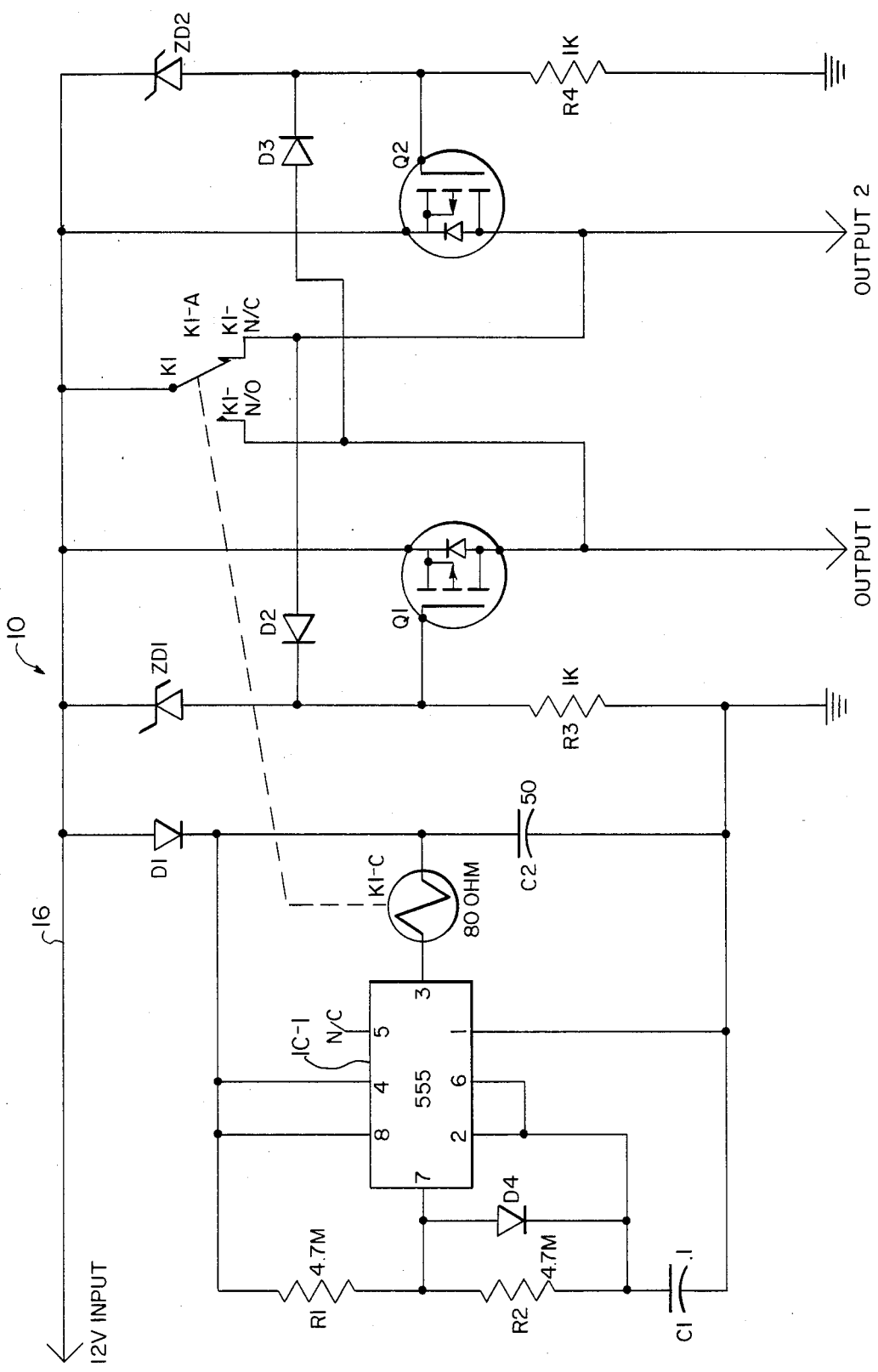
FIG. 3 is a schematic diagram of an alternating type of heavy duty lamp flasher embodying the present invention.

The arrangement of FIG. 3 represents yet another variation providing a circuit of the alternating type, wherein diode D1 is connected to the capacitor C2 and the relay coil K1-C as shown between the supply lead 16 and ground, and two N channel MOSFET transistors Q1 and Q2 are provided, each connected through respective diodes D2 and D3 and zener ZD1 and ZD2 to the supply lead 16 and through resistors R3 and R4 to ground, and are connected to respective normally open and normally closed contacts K1-N/O and K1-N/C of the relay as shown.

Figure 4:
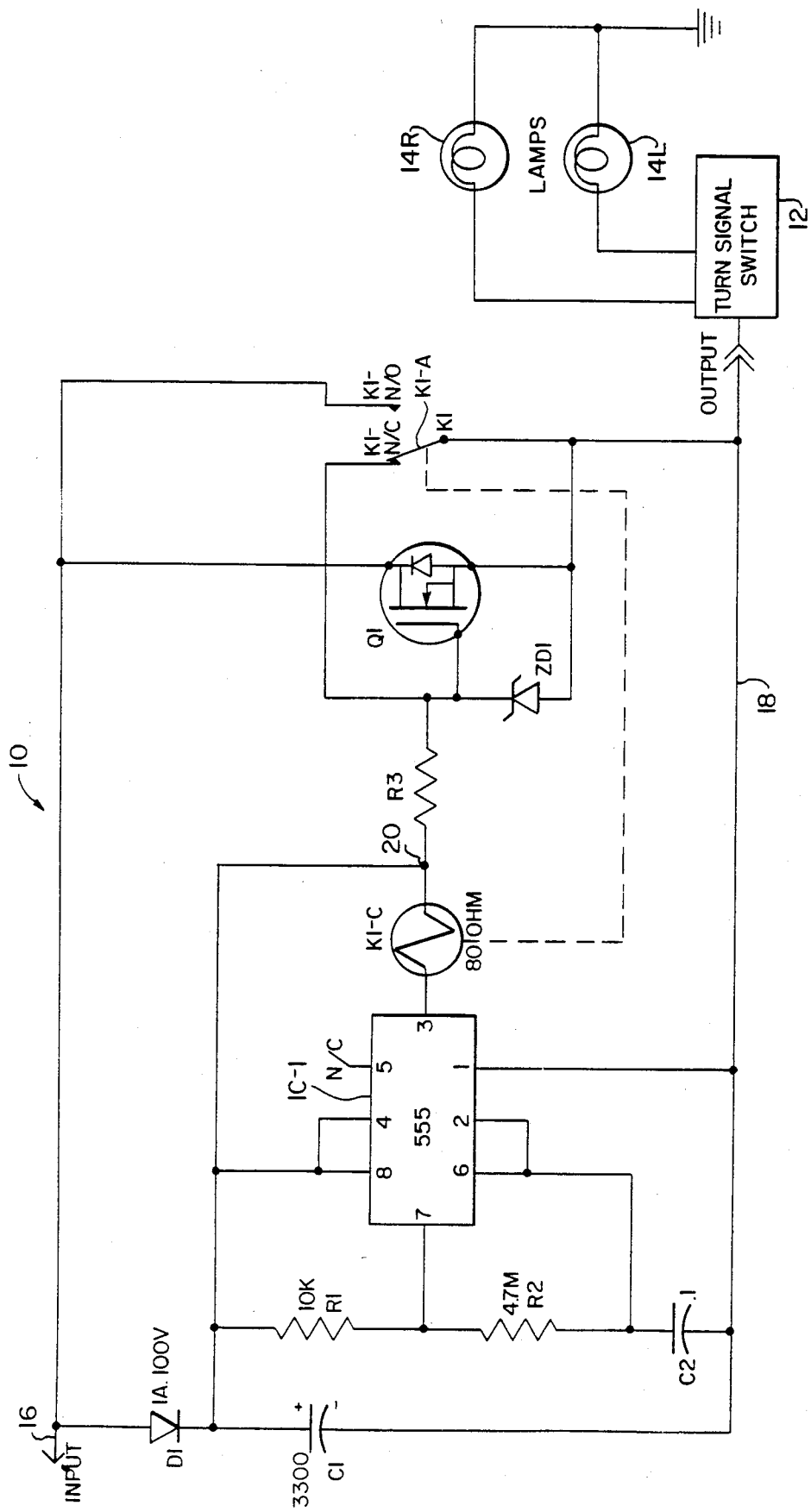
FIG. 4 is a schematic diagram of a variation of the in line type of heavy duty lamp flasher of FIG. 1, using a single supply.

Yet another modification is shown in FIG. 4, wherein the diodes D2 and C3 of the FIG. 1 circuit are eliminated and the gate of the transistor Q1 is pulled high by charging of the capacitor C1 through the diode D1, the circuit otherwise operating in the same manner as the circuit of FIG. 1

In each of these embodiments, it will be apparent that the solid state switch formed by either the single N channel power MOSFET transistor Q1, or a pair of such transistors, or by the transistor means forming the Darlington circuit of FIG. 2, works in parallel with the mechanical switch formed by the movable contact arm K1-A and the stationary contacts K1-N/C and K1-N/O, and the use of the inherent mechanical delay of the mechanical contacts controls the solid state switch, such that the relay contacts have to switch only the additional current produced by elimination of the voltage drop across the transistor or transistor means when the contacts close. The fact that the transistor means is on when the relay is in the state of transition effect the reduction in arcing arising from contact bounce and contact opening which redue operating life of conventional electromechanical relay controls for such flasher lamps and the like.

In the illustrative examples shown in the drawings, the values of the capacitors indicated in microfarads and for the resistors in ohms for several satisfactory examples. In those examples, the relay is a 12 volt relay with an 80 ohm coil and the transistors are 12 amp N channel power MOSFET transistors. These values, of course, may be changed.

I claim:

1. A heavy duty lamp flasher for turn and emergency signals for lamps of trucks, trailers and the like, comprising a turn signal switch, a pair of turn signal lamps each having a lamp filament, a switching relay having a relay coil and a contact arm controlled thereby for movement between a normally closed contact and an normally open contact, and an arc suppression circuit comprising a transistor in parallel with the switching relay to minimize contact arching and load carrying limitations, the transistor having a gate and source and drain terminals, diode means connected to and forming a charging ciruclt with associated capacitor means between a voltage supply and electrical ground and connected to the gate of said transistor and to said relay coi., oscillator circuit means connected to the relay coil to switch the condition of the normally open and closed contacts back and forth, the transistor having its source connected to the relay contact arm and to the signal lamp filaments and having its drain connected to said normally open contacts, and the transistor gate being connected to the normally closed relay contact to control the transistor whereby the transistor provides the primary current path for the signal lamp filaments as the relay contact arm undergoes forward movement from the normally closed contact toward the normally open contact and return movement toward the normally closed contact, the normally open contact providing the lamp primary current path when closed and the transistor being turned off upon reclosing of the normally closed contact until the oscillator circuit means initiates another cycle, the load thus being shared by the transistor as well as the switching relay.

2. A heavy duty lamp flashers as recited in claim 1, wherein said diode means and the associated capacitor means comprise a first diode and associated capacitor having an connectin therebetween to said oscillator circuit means and a second diode and associated capacitor having a connection therebetween to said relay coil and the gate of said transistor, charging of the capacitor associated with the first-mentioned diode providing the operating voltage for the oscillator circuit means upon closing of the turn signal switch and charging of such capacitor.

3. A heavy duty lamp flasher as recited in claim 1, wherein said oscillator circuit means is an integrated circuit having an output connection to said relay coil and having input connections across said capacitor means associated with said diode means.

4. A heavy duty lamp flasher as recited in claim 2 wherein said oscillator circuit means is an integrated circuit having an output connection to said relay coil and having input connections across said capacitor means associated with said first diode means.

5. A heavy duty lamp flasher as recited in claim 2, wherein the gate of said transistor is connected through a resistor to a junction between said second diode and its associated capacitor and to said relay coil.

6. A heavy duty lamp flasher as recited in claim 4, wherein the gate of said transistor is connected through a resistor to a junction between said second diode and its associated capacitor and to said relay coil.

7. A heavy duty lamp flasher as recited in claim 2, including a zener diode connected between the gate of the transistor and a connection between the transistor and said lamps for preventing the gate of the transistor from exceeding a predetermined maximum gate-to-source voltage.

8. A heavy duty lamp flasher as recited in claim 4, including a zener diode connected between the gate of the transistor and a connection between the transistor and said lamps for preventing the gate of the transistor from exceeding a predetermined maximum gate-to-source voltage.

9. A heavy duty lamp flasher as recited in claim 6, including a zener diode connected between the gate of the transistor and a connection between the transistor and said lamps for preventing the gate of the transistor from exceeding a predetermined maximum gate-to-source voltage.

10. A heavy duty lamp flasher as recited in claim 1, wherein said transistor means comprises a pair of transistors interconnected as a darlington pair forming two transistor sections, the gate of the first transistor section being connected to said diode means and associated capacitor means and to said normally closed relay contact.

11. A heavy duty lamp flasher as recited in claim 10, wherein said transistor means comprises a pair of transistors interconnected as a darlington pair forming two transistor sections, the gate of the first transistor section being connected to a juncture between said second diode and its associated capacitor and to said relay coil.

12. A heavy duty lamp flasher as recited in claim 4, wherein said transistor means comprises a pair of transistors interconnected as a darlington pair forming two transistor sections, the gate of the first transistor section being connected to a juncture between said second diode and its associated capacitor and to said relay coil.

13. A heavy duty lamp flasher as recited in claim 6, wherein said transistor means comprises a pair of transistors interconnected as a darlington pair forming two transistor sections, the gate of the first transistor section being connected to a juncture between said second diode and its associated capacitor and to said relay coil.

14. A heavy duty lamp flasher as recited in claim 8 wherein said transistor means comprises a pair of transistors interconnected as a darlington pair forming two transistor sections, the gate of the first transistor section being connected to a juncture between said second diode and its associated capacitor and to said relay coil.

15. A heavy duty lamp flasher as recited in claim 2, wherein said transistor means comprises a pair of transistors each connected to a respective one of said first and second diodes and through a respective zener diode to a voltage supply therefor and connected through respective resistors to electrical ground, one of said transistors being connected to said normally open relay contact and the other transistor being connected to said normally closed relay contact.

* * * * *